United States Patent Office 3,366,664
Patented Jan. 30, 1968

3,366,664
SELECTED CYANOMETHYLENECYCLOPROPENES
Sam Andreades, Wilmington, Del., assignor to E. I. du Pont de Nemours and Company, Wilmington, Del., a corporation of Delaware
No Drawing. Filed Nov. 12, 1964, Ser. No. 410,747
3 Claims. (Cl. 260—465)

ABSTRACT OF THE DISCLOSURE

This disclosure describes and claims certain cyanomethylenecyclopropenes, e.g., 1,2 - diphenyl - 3 - dicyanomethylenecyclopropene and 1,2 - diphenyl - 3 - [cyano(ethoxycarbonyl)methylene]cyclopropene, prepared by reacting cyclopropenones with active methylene compounds. The products are useful as polymerization inhibitors.

*Field of the invention*

This invention relates to, and has as its principal objects provision of, certain novel compounds, cyanomethylenecyclopropenes.

*Detailed description of the invention*

The compounds of this invention are cyanomethylenecyclopropenes having the formula

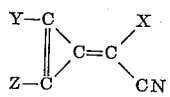

wherein X is CN or COOR, R being alkyl or fluoroalkyl of up to 12 carbon atoms, and Y and Z, alike or different, are unsubstituted, or substituted, monocyclic aryl having up to 18 carbon atoms, e.g.,

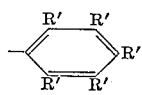

wherein the R's, which can be alike or different, are hydrogen, halogen (fluorine, chlorine, bromine or iodine), nitro, alkyl or alkoxy of up to 12 carbons, or —NR''R''', R''', alike or different, being hydrogen or alkyl of up to 12 carbons. Any substituents may be ortho, meta or para to the carbon of the benzene ring attached to the cyclopropene ring except for iodo and alkyl, which may not be ortho, and there may not be two ortho substituents. A more restricted and preferred group of these novel compounds are those in which Y and Z are unsubstituted, or monosubstituted, monocyclic aryl having up to 12 carbons, and where R' is lower alkyl, i.e., alkyl of 1–6 carbon atoms.

The compounds of the invention are prepared by contacting a cyclopropenone of the general formula

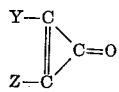

wherein Y and Z are as above, e.g., diphenylcyclopropenone, with an active methylene compound of the general formula

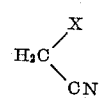

wherein X is as above, e.g., malononitrile or ethyl cyanoacetate, at a temperature below that at which the product will decompose.

An equation for the overall reaction can thus be written as:

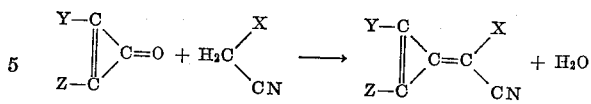

In accomplishing this reaction, the relative amounts of cyclopropenone and methylene compounds may vary from a large (e.g., 5-fold) excess of ketone to a large (5-fold) excess of the active hydrogen compound. However, a moderate excess of the methylene compound (20%) is preferred.

The reaction is preferably carried out in the presence of acetic anhydride as a solvent. This compound serves to scavenge the water produced by the condensation reaction to form acetic acid, a satisfactory cosolvent for the reaction. It is not necessary to employ other cosolvents, but inert materials can be added such as cyclohexane, toluene and the like.

Temperatures used in the reaction can vary widely, e.g., from 0° to 300° C., but reflux temperature is normally used. Reflux temperature is about 140° C. for acetic anhydride at atmospheric pressure. The pressure under which the reaction is carried out is not critical. Reaction pressures ranging from subatmospheric to superatmospheric are operable, but it is generally preferable to carry out the reaction at atmospheric pressure. About two hours' reaction time are required to obtain a satisfactory yield (20–24%) but product is formed in 15 minutes to 24 hours.

The reaction can be carried out in the absence of a catalyst, but the yields are increased by use of an amphoteric catalyst of the type represented by β-alanine and other amino acids, e.g., glycine, phenylalanine, leucine, etc.

*Embodiments of the invention*

There follow some nonlimiting examples which illustrate the invention in greater detail. In these examples, pressures are atmospheric.

EXAMPLE 1

*1,2-diphenyl-3-dicyanomethylenecyclopropene*

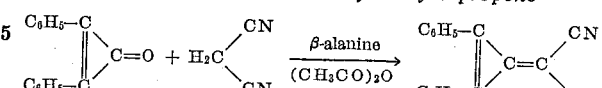

(A) Diphenylcyclopropenone may be prepared as follows:

To a solution of 16 g. of triethylamine in 300 ml. of methylene chloride at 15–20° C. is added 18.4 g. of solid α,α' - dibromodibenzyl ketone over a period of approximately 5 min., the solution being maintained between 15–20° C. in a water bath. The solution slowly turns yellow to deep red. After 30 min., the mixture is filtered to remove the triethylammonium hydrobromide and the filtrate is cooled in ice for an hour and then extracted with five 300-ml. portions of cold water. The organic layer is dried over anhydrous sodium sulfate and evaporated over a rotary evaporator to a volume of about 75 ml.

The evaporated mixture is chromatographed on 300 g. of silicic acid (100 mesh, Mallincrodt analytical reagent). Elution with ethyl acetate first gives a small amount of red-tan material followed by 5.5 g. of yellow product. Recrystallization of the yellow product from benzene/cyclohexane (ca. 1:4 by volume) gives material melting at 119–120° C. The mother liquors from the recrystallization can be evaporated and the residue sublimed to obtain additional material. The total yields amount to 50–60% of diphenylcyclopropenone.

(B) To 0.67 g. of diphenylcyclopropenone and 0.25 g. of malononitrile in 3.5 ml. of acetic anhydride was added 0.01 g. of β-alanine. The mixture was refluxed for 2 hrs. and allowed to cool overnight. The mixture was chilled in an ice bath and filtered to collect 0.17 g. (19.5%) of essentially pure yellow crystals. Recrystallization from acetonitrile gave 1,2-diphenyl-3-dicyanomethylenecyclopropene, M.P. 288–290° (dec.).

The infrared spectrum of the product (KBr pellet) showed strong absorption at 2230, 1870, 1600, 1517, 1480, 1450 and 1390 cm.$^{-1}$.

The ultraviolet spectrum in acetonitrile showed the following $\lambda_{max}$ and $\epsilon$ values: 347 (13,750), 298 (28,300), 286 (30,300), 267 (28,600), 261 (26,600 sh.), 252 (21.250 sh.), 237.5 (18,600), 230 (17,250), and end absorption at 220 mμ.

*Analysis.*—Calcd. for $C_{18}H_{10}N_2$: C, 85,02; H, 3.96; N, 11.02; mol. wt. 254.27. Found: C, 85.39; H, 3.74; N, 11.04; mol. wt. 254 (mass spec.), 250 (vapor pressure osmometry in $CHCl_3$).

(C) Evaporation to dryness of the filtrate from a 5-g. run of B and sublimation of the residue at 198° (0.1 mm.) gives 2.3 g. of white sublimate from which was isolated 0.08 g. of trans-α-phenylcinnamic acid, M.P. 169–171° (lit., M.P. 172°). The infrared spectrum of this sample was identical to that of an authentic sample.

(D) Using 93.23 mg. of 1,2-diphenyl-3-dicyanomethylenecyclopropene, 15 mg. of palladium-on-charcoal, 50 mg. of sodium carbonate and 25 ml. of ethanol, 0.0138 g. $H_2$/g. of sample was consumed indicating reduction to the extent of 1.8 double bonds/molecule.

EXAMPLE 2

*1,2-diphenyl-3-[cyano(ethoxycarbonyl)methylene]cyclopropene*

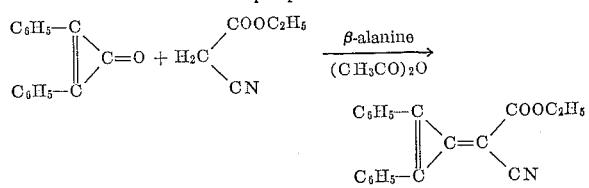

A mixture of 5.0 g. of diphenylcyclopropenone and 4.5 g. of ethyl cyanoacetate in 30 ml. of acetic anhydride containing a trace of β-alanine was refluxed for 3 hrs. under dry nitrogen. The hot homogeneous solution was allowed to cool slowly and finally chilled in ice. Filtration gave 1.1 g. (14.6%) of 1,2-diphenyl-3-[cyano(ethoxycarbonyl)methylene]cyclopropene, M.P. 148–156°. Recrystallization from benzene/hexane (1:1) gave a sample, M.P. 159–160°.

*Analysis.*—Calcd. for $C_{20}H_{15}NO_2$: C, 79.71; H, 5.02; N, 4.65; mol. wt. 301.33. Found: C, 79.36; H, 4.98; N, 4.39; mol. wt. 301 (mass spec.), 318 (B.P. in benzene).

The infrared spectrum of this material (KBr) showed strong absorption at 2255, 1885, 1710, and weaker absorption at 1640, 1615 and 1587 cm.$^{-1}$.

The proton n-m-r spectrum in deuteriochloroform (internally referenced from tetramethylsilane) showed bands at 1.62τ (area 4), 2.26τ (area 6), a $CH_2$ quartet at 5.36τ (area 2), and $CH_3$ triplet at 8.62τ (area 3), $$J_{CH_3CH_2} = 7 \text{ c.p.s.}$$

In the first column of the table below are listed specific cyclopropenones which, when reacted with malononitrile or the cyanoacetate listed in column 2 by the procedure illustrated by Examples 1 and 2, give the specific cyanomethylenecyclopropenes listed in column 3.

| Reactants | | Products |
|---|---|---|
| Aryl Cyclopropenone | Active Hydrogen Compound | Cyanomethylenecyclopropene |
| Di(o-fluorophenyl)cyclopropenone | Perfluoroethyl cyanoacetate | 1,2-di(o-fluorophenyl)-3-[cyano(perfluoroethoxycarbonyl)methylene]cyclopropene. |
| Di(m-chlorophenyl)cyclopropenone | Dodecyl cyanoacetate | 1,2-di(m-chlorophenyl)-3-[cyano(dodecyloxycarbonyl)methylene]cyclopropene. |
| Di(m-bromophenyl)cyclopropenone | Malononitrile | 1,2-di(m-bromophenyl)-3-dicyanomethylenecyclopropene. |
| Di(p-iodophenyl)cyclopropenone | Methyl cyanoacetate | 1,2-di(p-iodophenyl)-3-[cyano(methoxycarbonyl)methylene]cyclopropene. |
| Di(o-tolyl)cyclopropenone | Octyl cyanoacetate | 1,2-di(o-tolyl)-3-[cyano(octyloxycarbonyl)methylene]cyclopropene. |
| Di(m-ethylphenyl)cyclopropenone | Butyl cyanoacetate | 1,2-di(m-ethylphenyl)-3-[cyano(butoxycarbonyl)methylene]cyclopropene. |
| Di(p-n-hexylphenyl)cyclopropenone | Malononitrile | 1,2-di(p-n-hexylphenyl)-3-dicyanomethylenecyclopropene. |
| Di(p-dodecylphenyl)cyclopropenone | do | 1,2-di(p-dodecylphenyl)-3-dicyanomethylenecyclopropene. |
| Di(m-dimethylaminophenyl)cyclopropenone | β-Fluoroethyl cyanoacetate | 1,2-di(m-dimethylaminophenyl)-3-[cyano-(β-fluoroethoxybonyl)methylene]cyclopropene. |
| Di(p-methoxyphenyl)cyclopropenone | Hexyl cyanoacetate | 1,2-di(p-methoxyphenyl)-3-[cyano(hexyloxycarbonyl)methylene]cyclopropene. |
| Di(o-nitrophenyl)cyclopropenone | α,α-Dihydroperfluoropropyl cyanoacetate | 1,2-di(o-nitrophenyl)-3-[cyano-(α,α-dihydroperfluoropropoxycarbonyl)methylene]cyclopropene. |
| Di(p-methoxy-m-methylphenyl)cyclopropenone | Malononitrile | 1,2-di(p-methoxy-m-methylphenyl)-3-dicyanomethylenecyclopropene. |

The cyclopropenone reactants used in the process of this invention can be prepared by the method illustrated in Example 1, part A, and as described by Breslow, Posner and Krebs, J. Am. Chem. Soc., 85, 234 (1963). The active hydrogen reactants, i.e., malononitrile and alkyl or fluoroalkyl cyanoacetates, are readily available or can be made by well-known methods.

The compounds of this invention have various utilities. More particularly, they are useful as polymerization inhibitors. For example, trace amounts of 1,2-diphenyl-3-dicyanomethylenecyclopropene, prepared as in Example 1, were found to inhibit the polymerization of acrylonitrile containing azobis(isobutyronitrile) under conditions which caused the rapid polymerization of acrylonitrile control samples. The conditions were 5–15 min. at the temperature of refluxing acrylonitrile. The methylenecyclopropenes are also generically useful as ultraviolet light absorbers and as electrical insulators.

Another utility of the present methylenecyclopropenes is as chlorine scavengers and detectors. When chlorine gas is bubbled into an acetonitrile slurry of the dicyano- or the cyano(ethoxycarbonyl)methylenecyclopropene derivatives, a smooth and quantitative reaction with chlorine occurs at room temperature. The reaction is observed not only by a color change from orange to a light yellow, but also by the change from a heterogeneous mixture to a homogeneous solution. The latter phenomenon is due to the greater solubility of the dichloro derivatives compared to the methylenecyclopropenes.

Since obvious modifications and equivalents in the invention will be evident to those skilled in the chemical arts, I propose to be bound solely by the appended claims.

The embodiments of the invention in which an exclusive property or privilege is claimed are defined as follows:

1. A cyanomethylenecyclopropene of the formula

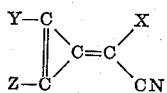

wherein:
X is selected from the group consisting of —CN and —COOR, R being selected from the group consisting of alkyl and fluoroalkyl of up to 12 carbons; and
Y and Z are monocyclic aryl of up to 18 carbons having the formula

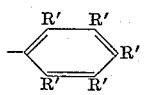

the R"s being selected from the group consisting of hydrogen, halogen, nitro, alkyl and alkoxy of up to 12 carbon and —NR"R", R" being selected from the group consisting of hydrogen and alkyl of up to 12 carbons, one R' in the ortho position always being hydrogen and neither being selected from the group consisting of iodo and alkyl.

2. 1,2-diphenyl-3-dicyanomethylenecyclopropene.
3. 1,2 - diphenyl-3-[cyano(ethoxycarbonyl)methylene] cyclopropene.

References Cited

UNITED STATES PATENTS 3,226,388  12/1965  Hartzler _____ 260—465 X

OTHER REFERENCES

Battiste, J.A.C.S., 86, pp. 942, 943 (1964).
Jones, et al., J.A.C.S., 86, pp. 944, 945 (1964).
Bergmann et al., J.A.C.S., 86, p. 3587 (1964).
Kende et al., J.A.C.S., 86, pp. 3587–3589 (1964).

JOSEPH P. BRUST, *Primary Examiner.*